US009373302B2

(12) United States Patent
Walker et al.

(10) Patent No.: US 9,373,302 B2
(45) Date of Patent: Jun. 21, 2016

(54) STACKED DEVICE POSITION IDENTIFICATION

(75) Inventors: David Ryan Walker, Waterloo (CA); Jerome Pasquero, Kitchener (CA); Donald Somerset McCulloch McKenzie, Waterloo (CA); Steven Henry Fyke, Waterloo (CA)

(73) Assignee: BLACKBERRY LIMITED, Waterloo, Ontario (CA)

(*) Notice: Subject to any disclaimer, the term of this patent is extended or adjusted under 35 U.S.C. 154(b) by 119 days.

(21) Appl. No.: 13/634,914

(22) PCT Filed: Aug. 10, 2012

(86) PCT No.: PCT/CA2012/050545
§ 371 (c)(1),
(2), (4) Date: Sep. 14, 2012

(87) PCT Pub. No.: WO2014/022905
PCT Pub. Date: Feb. 13, 2014

(65) Prior Publication Data
US 2014/0043209 A1     Feb. 13, 2014

(51) Int. Cl.
*G09G 5/00*     (2006.01)
*G06F 3/0488*     (2013.01)
(Continued)

(52) U.S. Cl.
CPC ............. *G09G 5/006* (2013.01); *G06F 1/1626* (2013.01); *G06F 1/1686* (2013.01); *G06F 1/1698* (2013.01); *G06F 3/0486* (2013.01); *G06F 3/0488* (2013.01); *G06F 3/04883* (2013.01);
(Continued)

(58) Field of Classification Search
CPC ......... G09G 5/006; G09G 5/003; G09G 5/12; G09G 5/14; G09G 5/32; G09G 5/37; G09G 2356/00; G09G 2370/16; G06F 1/16; G06F 3/011; G06F 3/017; G06F 3/0346; G06F 3/0488; G06F 3/14564; G06F 3/1454; H04M 1/7253; H04M 2250/52
See application file for complete search history.

(56) References Cited

U.S. PATENT DOCUMENTS

| 7,991,566 B2 | 8/2011 | Maas et al. | |
| 8,164,640 B2 * | 4/2012 | Vartiainen et al. | ......... 348/211.4 |

(Continued)

FOREIGN PATENT DOCUMENTS

CA     2757527     5/2012

OTHER PUBLICATIONS

Optical Mouse, http://web.archive.org/web/20100613192052/http://en.wikipedia.org/wiki/Optical_mouse, Jun. 13, 2010.
(Continued)

*Primary Examiner* — Aneeta Yodichkas
*Assistant Examiner* — Richard Hong
(74) *Attorney, Agent, or Firm* — Rowand LLP

(57) ABSTRACT

Methods and electronic devices for identifying a location of a top electronic device stacked on top of a bottom electronic device are described. In one example embodiment, the top electronic device and the bottom electronic device are configured to communicate. In one example embodiment, the method includes: receiving camera data associated with a camera of the top electronic device; obtaining display data identifying a pixel arrangement on at least a portion of a display of the bottom electronic device; and identifying the position of the top electronic device relative to the bottom electronic device based on the camera data and the display data.

15 Claims, 13 Drawing Sheets

(51) Int. Cl.
  *G06F 3/14*     (2006.01)
  *H04M 1/725*    (2006.01)
  *G06F 1/16*     (2006.01)
  *G06F 3/0486*   (2013.01)

(52) U.S. Cl.
  CPC .......... *G06F 3/04886* (2013.01); *G06F 3/1454* (2013.01); *H04M 1/7253* (2013.01); *G06F 2203/04804* (2013.01); *G06F 2203/04805* (2013.01); *G09G 2356/00* (2013.01); *G09G 2370/16* (2013.01); *H04M 2250/52* (2013.01)

(56) References Cited

U.S. PATENT DOCUMENTS

| | | | |
|---|---|---|---|
| 8,207,832 | B2 | 6/2012 | Yun et al. |
| 8,589,952 | B2 * | 11/2013 | Wong et al. .................... 719/319 |
| 2003/0098845 | A1 * | 5/2003 | Hanson ................. G06F 1/1601 345/156 |
| 2005/0146518 | A1 * | 7/2005 | Wang et al. ................... 345/179 |
| 2006/0047462 | A1 | 3/2006 | Picciotto et al. |
| 2007/0001950 | A1 * | 1/2007 | Zhang ..................... G06F 3/037 345/88 |
| 2008/0228433 | A1 | 9/2008 | Meyer et al. |
| 2009/0213032 | A1 * | 8/2009 | Newport et al. ............... 345/1.1 |
| 2010/0060572 | A1 * | 3/2010 | Tsern ........................... 345/157 |
| 2010/0333088 | A1 * | 12/2010 | Rogel et al. ........................ 718/1 |
| 2011/0016405 | A1 | 1/2011 | Grob et al. |
| 2011/0163955 | A1 | 7/2011 | Nasiri et al. |
| 2011/0184646 | A1 | 7/2011 | Wong et al. |
| 2011/0227827 | A1 * | 9/2011 | Solomon et al. .............. 345/158 |
| 2011/0295502 | A1 | 12/2011 | Faenger |
| 2012/0007943 | A1 | 1/2012 | Tytgat |

OTHER PUBLICATIONS

David Dearman, et al., "Determining the Orientation of Proximate Mobile Device Using Their Facing Camera", May 5, 2012.

iTunes Preview, "iTunes is the world's easiest way to organize and add to your digital library media collection", Mar. 7, 2012.

"Determining the Relative Position of 2 Mobile Devices Using Ultrasound", retrieved Jul. 1, 2012.

International Search Report and Written Opinion dated Apr. 29, 2013.

* cited by examiner

STACKED DEVICE POSITION IDENTIFICATION

TECHNICAL FIELD

The present disclosure relates to electronic devices and, more particularly, to methods and electronic devices for identifying a relative position of a top electronic device that has been stacked on top of a bottom electronic device.

BACKGROUND

Increasingly, electronic device users have access to a plurality of electronic devices of varying types. For example, electronic device users often have access to a smartphone, which they use for ultra-portable computing and for communications, and also have access to a tablet computer, a laptop computer and/or a desktop computer.

Such electronic devices are sometimes capable of interacting with one another. For example, when such electronic devices are near one another, they may send and receive data to one another over a short range protocol, such as Bluetooth.

Electronic devices currently provide limited interactive functions for interacting with other electronic devices.

BRIEF DESCRIPTION OF THE DRAWINGS

Like reference numerals are used in the drawings to denote like elements and features.

DETAILED DESCRIPTION OF EXAMPLE EMBODIMENTS

In one example embodiment, the present disclosure describes a processor implemented method of identifying a location of a top electronic device stacked on top of a bottom electronic device. The top electronic device and the bottom electronic device are configured to communicate. The method includes: receiving camera data associated with a camera of the top electronic device; obtaining display data identifying a pixel arrangement on at least a portion of a display of the bottom electronic device; and identifying the position of the top electronic device relative to the bottom electronic device based on the camera data and the display data.

In yet another example embodiment, the present disclosure describes a top electronic device. The top electronic device includes a camera and a communication subsystem for communicating with a bottom electronic device. The top electronic device also includes a processor configured to: receive camera data associated with a camera of the top electronic device; obtain display data identifying a pixel arrangement on at least a portion of a display of the bottom electronic device; and identify the position of the top electronic device relative to the bottom electronic device based on the camera data and the display data.

In yet another example embodiment, the present disclosure describes a bottom electronic device. The bottom electronic device includes a display and a communication subsystem for communicating with a bottom electronic device. The bottom electronic device also includes a processor configured to: receive camera data associated with a camera of the top electronic device; obtain display data identifying a pixel arrangement on at least a portion of a display of the bottom electronic device; and identify the position of the top electronic device relative to the bottom electronic device based on the camera data and the display data.

Other example embodiments of the present disclosure will be apparent to those of ordinary skill in the art from a review of the following detailed description in conjunction with the drawings.

Figure 1:
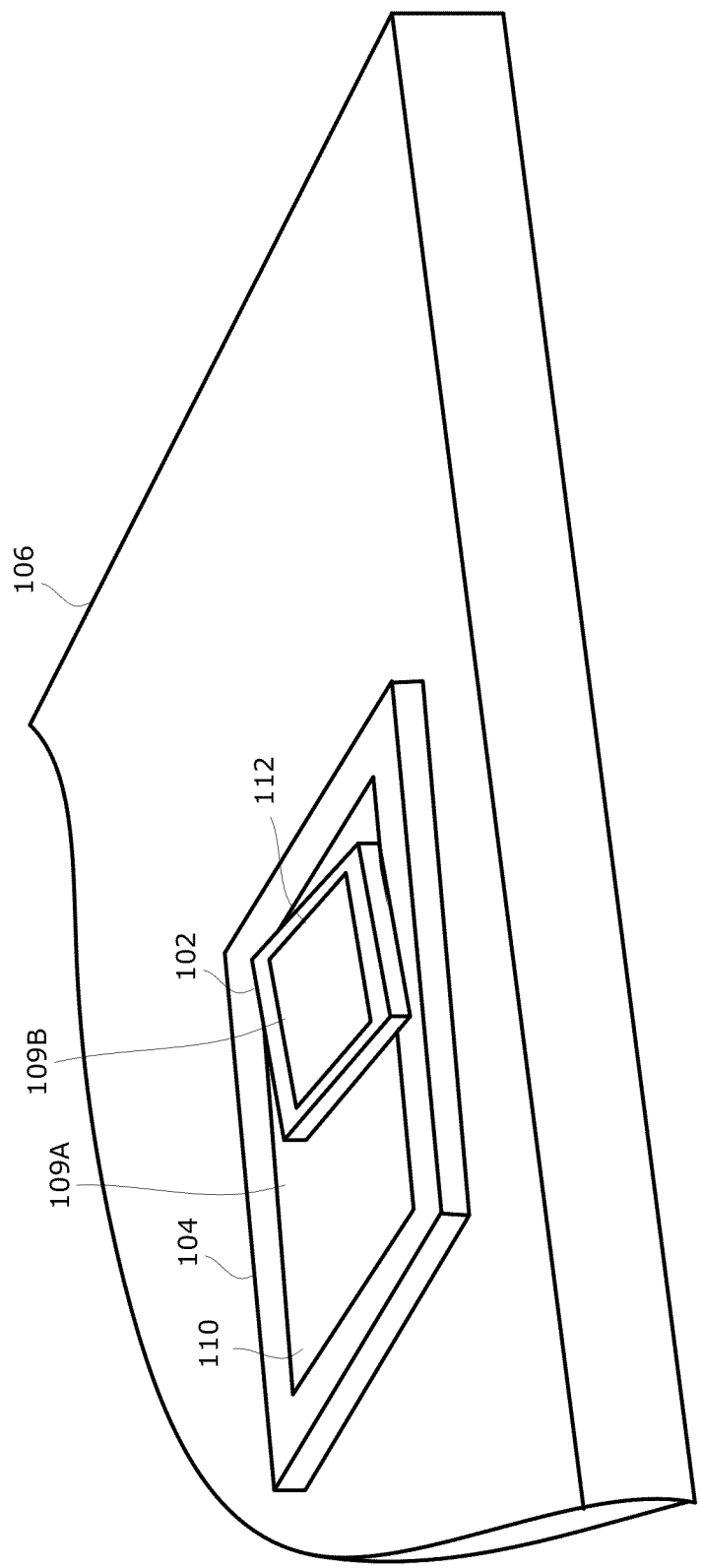
FIG. 1 is a perspective view of a top electronic device stacked on top of a bottom electronic device in accordance with example embodiments of the present disclosure.
Figure 2:
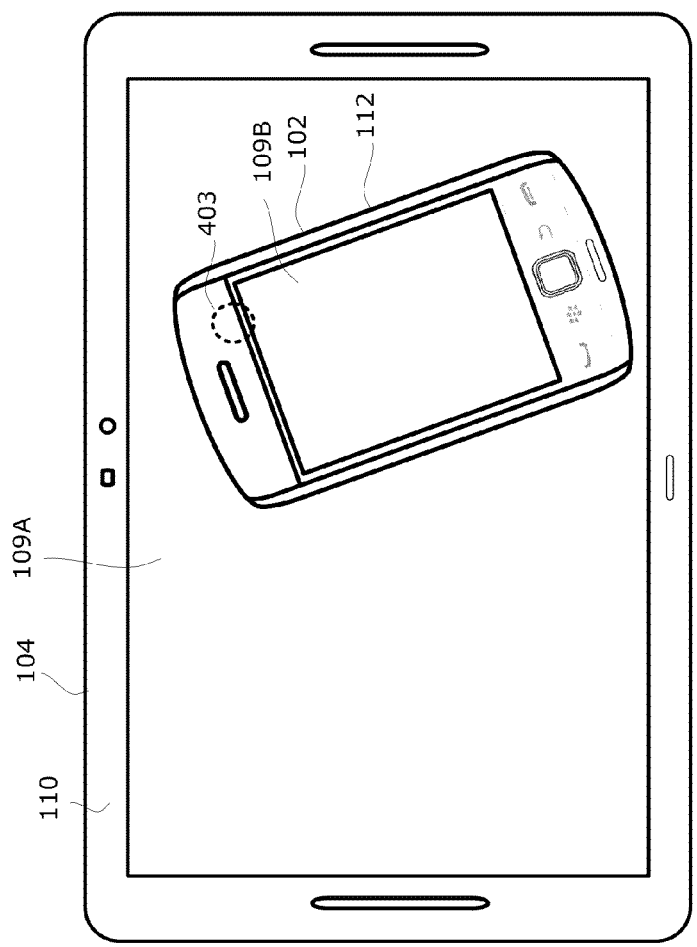
FIG. 2 is a top view of a top electronic device stacked on top of a bottom electronic device in accordance with example embodiments of the present disclosure.
Figure 3:
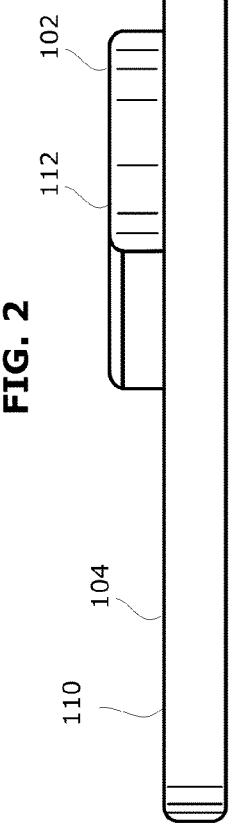
FIG. 3 is a side elevation view of the top electronic device and bottom electronic device in the stacked orientation of FIG. 2 in accordance with example embodiments of the present disclosure.

Referring first to FIG. 1, a perspective view is illustrated of a top electronic device 102 and a bottom electronic device 104 in a stacked orientation. More particularly, the top electronic device 102 is stacked on top of the bottom electronic device 104. That is, in the stacked orientation of FIG. 1, the bottom electronic device 104 supports the top electronic device 102. The stacked orientation of the top electronic device 102 and the bottom electronic device 104 is also illustrated in FIGS. 2 and 3. FIG. 2 illustrates a top view of the top electronic device 102 stacked on top of the bottom electronic device 104 and FIG. 3 illustrates a side view of the electronic devices 102, 104 in the stacked position.

The bottom electronic device 104 has a display 109A and, at least a portion of the display 109A is obscured by the top electronic device 102 when the electronic devices 102, 104 are in the stacked orientation. That is, the top electronic device 102 sits directly over at least a portion of the display 109A of the bottom electronic device.

In at least some example embodiments, the top electronic device 102 may also include a display 109B.

In the example embodiment illustrated in FIG. 1, the two electronic devices are placed upon a table 106. That is, the electronic devices are held in a substantially horizontal orientation. The bottom electronic device 104 is supported at a rear side by the table 106 and the top electronic device 102 is placed on a top side 110 of the bottom electronic device 104. More particularly, a rear side 401 (shown in FIG. 4) of the top electronic device 102 is placed upon the top side 110 of the bottom electronic device 104 such that the top electronic device 102 is supported by the bottom electronic device 104.

In the example illustrated, the top electronic device 102 is smaller than the bottom electronic device 104. More particularly, in the example illustrated, the top side 110 of the bottom electronic device 104 has a greater area than a top side 112 of the top electronic device 102. In the example illustrated, the display 109A of the bottom electronic device 104 is larger than the display 109B of the top electronic device 102 and the display 109A of the bottom electronic device 104 is larger than the top side 112 of the top electronic device 102. In the example embodiments of FIGS. 1, 2 and 3, when the top electronic device 102 is stacked on top of the bottom electronic device 104, a portion of the display 109A of the bottom electronic device 104 remains visible and a portion of the display 109A of the bottom electronic device 104 is obscured by the top electronic device 102.

In the example illustrated, the top electronic device 102 and the bottom electronic device 104 are substantially rectangular. However, the electronic devices 102, 104 could have other form factors in other example embodiments.

In the example embodiment illustrated, the top electronic device 102 is a smartphone and the bottom electronic device 104 is a tablet computer. However, in other example embodiments, other electronic devices may be used. For example, in at least some example embodiments, the electronic devices may both be smartphones or may both be tablet computers. In various example embodiments, one or more of the electronic devices 102, 104 may be a smartphone, tablet computer, wearable computer (such as a watch), a mobile telephone or PDAs (personal digital assistants), a television, a navigation device (such as a global positioning system device) or a computer system. Accordingly, the electronic devices 102, 104 may take a variety of forms.

A smartphone is a communication device that is typically configured for more advanced computing than a non-smart cellular phone. For example, the smartphone may be configured to allow third party applications to be executed and may be configured to access the Internet and Internet-based services. A tablet computer (which may also be referred to as a tablet) is a mobile computer which is generally larger than a mobile phone (such as a smartphone) or personal digital assistant. Many mobile phones or personal digital assistants are designed to be pocket sized. That is, mobile phones (such as smartphones) or personal digital assistants are generally small enough to be carried by a person easily, often in a shirt or pant pocket while tablet computers are larger and may not fit within pant pockets. For example, many tablet computers have a height with is seven inches (7") or more.

Referring again to FIG. 3, the camera 403 has been illustrated using broken lines to illustrate the positioning of the camera 403 when the top electronic device 102 and the bottom electronic device 104 are located in the stacked orientation. In this orientation, the camera 403 is directed at the top side 110 of the bottom electronic device 102. More particularly, in the stacked orientation, the camera 403 of the top electronic device 102 may be aligned with a portion of the display 109A of the bottom electronic device 102. Since the camera 403 is directly aligned with a portion of the display, light generated by that portion of the display 109A is received at the camera 403.

As will be explained below with reference to FIGS. 6 to 10, camera data obtained from the camera 403 of the top electronic device 102 may be compared to display data identifying a pixel arrangement of at least a portion of the display 109A to identify the position of the top electronic device 102 relative to the bottom electronic device 104. That is, by comparing what was displayed on the display 109A of the bottom electronic device 104 with what was received at the camera 403 of the top electronic device 102, the relative position may be determined.

Figure 4:
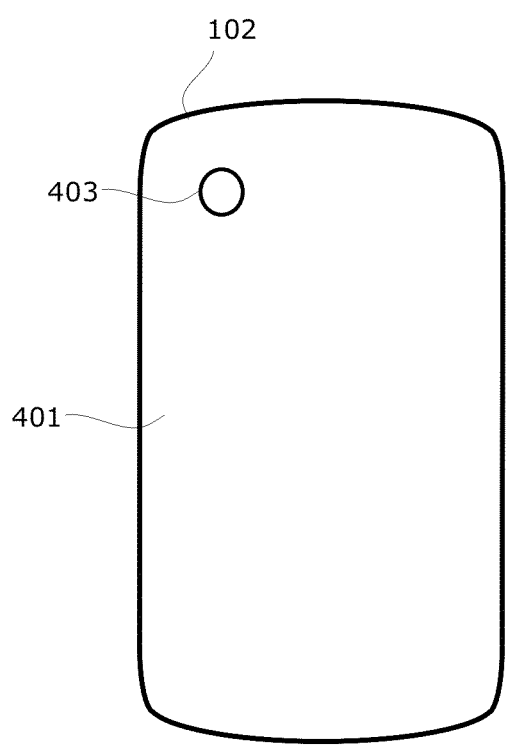
FIG. 4 is a rear view of the top electronic device of FIG. 2 in accordance with example embodiments of the present disclosure.

Referring now to FIG. 4, the rear side 401 of the top electronic device 102 is illustrated. The top electronic device 102 includes a camera 403 located at the rear side 401 of the top electronic device 102. That is, the top electronic device 102 includes a rear-facing camera.

A rear facing camera is provided by a camera 403 which is located to obtain images of a subject near a rear side 401 of the top electronic device 102. The rear side 401 is typically a side which does not include the main display 109B (FIGS. 1 and 2) of the top electronic device 102. The rear side 401 is the side that is nearest the bottom electronic device 104 when the electronic devices 102, 104 are placed in the stacked orientation.

In at least some example embodiments, the top electronic device 102 may operate in one operating mode in which the display 109B acts as a viewfinder displaying image data associated with camera data received by a rear facing camera. The rear side 401 of the top electronic device 102 is a side of top electronic device 102 that directly opposes the top side 112 of the top electronic device 102. In the example embodiment illustrated, the rear side 401 is substantially parallel to the top side 112.

The camera 403 is capable of capturing camera data such as images in the form of still photographs and/or motion video. The camera data may be captured in the form of an electronic signal which is produced by an image sensor. The image sensor is configured to produce an electronic signal in dependence on received light. More particularly, the image sensor converts an optical image into an electronic signal that represents electronic image data (which may also be referred to as camera data).

While FIGS. 3 and 4 illustrate a top electronic device 102 having a single camera 403, in other example embodiments, the top electronic device 102 may be equipped with a greater number of cameras. For example, in some example embodiments, the top electronic device 102 may also be equipped with a front facing camera which is configured to capture images of subjects near the top side 112 of the top electronic device 102.

In some example embodiments, the top electronic device 102 may include a plurality of rear facing cameras 403. For example, in some example embodiments, the top electronic device may include two or more rear facing cameras 403 which may be used, in at least one operating mode, for capturing three-dimensional images such as stereoscopic images. In at least some such example embodiments, the camera data from more than one camera may be compared to the display data to determine the relative position of the top electronic device 102 relative to the bottom electronic device 104.

Example Electronic Device

Figure 5:
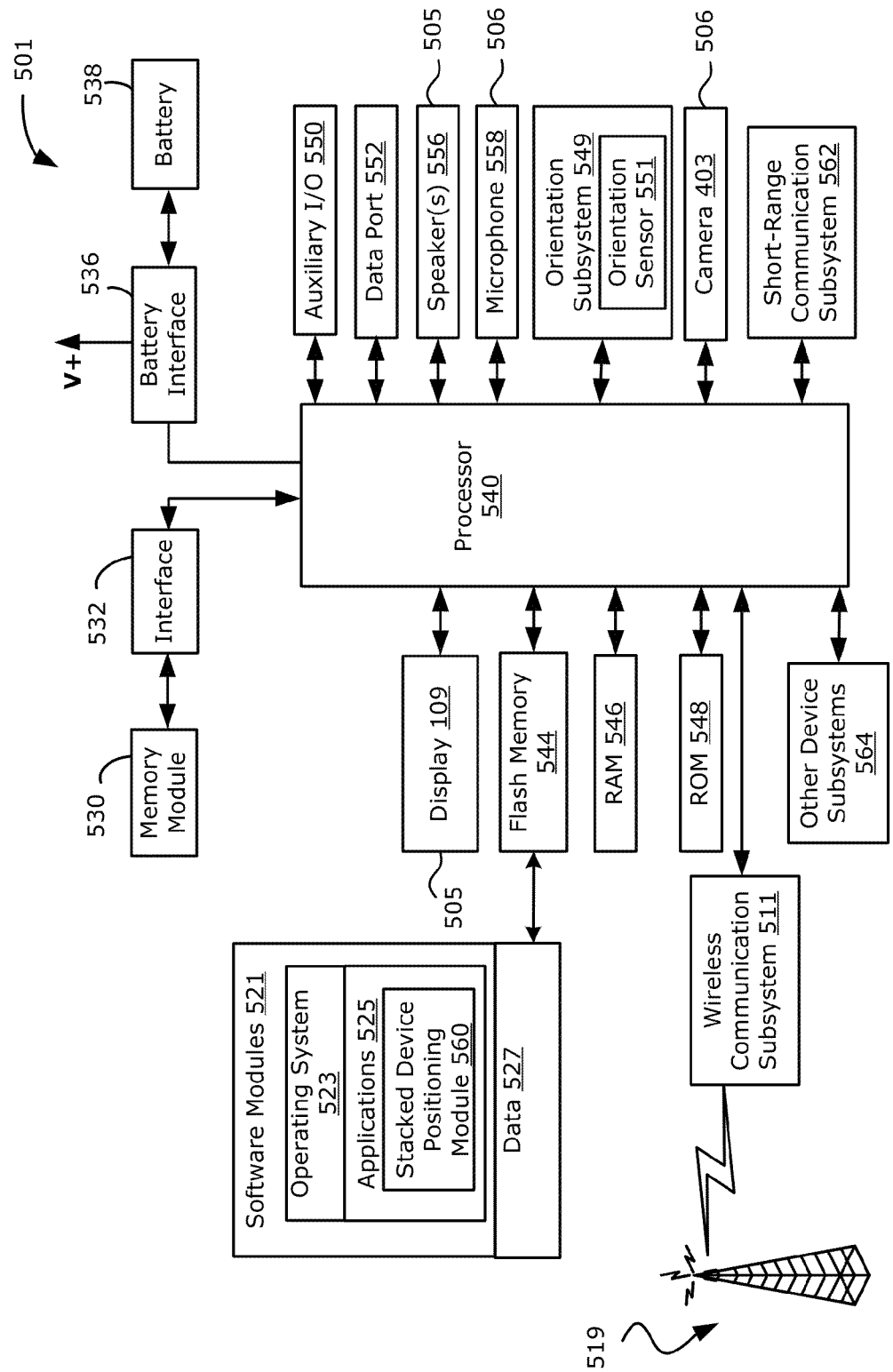
FIG. 5 is a block diagram of an example electronic device in accordance with example embodiments of the present disclosure.

Reference will now be made to FIG. 5 which illustrates an example electronic device 501 in which example embodiments described in the present disclosure can be applied. The top electronic device 102 and the bottom electronic device 104 may include the features described with reference to the example electronic device 501 of FIG. 5. That is, the example electronic device 501 may represent an example top electronic device 102, an example bottom electronic device 104, or both.

The electronic device 501 includes a controller including one or more processor 540 (such as a microprocessor) which controls the overall operation of the electronic device 501. The processor 540 interacts with device subsystems such as a wireless communication subsystem 511 for exchanging radio frequency signals with a wireless network 519 to perform long-range communication functions. The processor 540 is communicably coupled with additional device subsystems including one or more output interfaces 505 (such as a display 109 and/or a speaker 556), one or more input interfaces 506 (such as a camera 403, microphone 558, keyboard (not shown), control buttons (not shown), a touch-sensitive overlay (not shown)) associated with a touchscreen display 109 and/or other input interfaces 506), an orientation subsystem 549, memory (such as flash memory 544, random access memory (RAM) 546, read only memory (ROM) 548, etc.), auxiliary input/output (I/O) subsystems 550, a data port 552 (which may be a serial data port, such as a Universal Serial Bus (USB) data port), a short-range communication subsystem 562 and other device subsystems generally designated as 564. Some of the subsystems shown in FIG. 1 perform communication-related functions, whereas other subsystems may provide "resident" or on-device functions.

In at least some example embodiments, the electronic device 501 may include a touchscreen display 109 which acts as both an input interface 506 (i.e. touch-sensitive overlay) and an output interface 505 (i.e. display). The touchscreen display may be constructed using a touch-sensitive input surface which is connected to an electronic controller and which overlays the display 109. The touch-sensitive overlay and the electronic controller provide a touch-sensitive input interface 506 and the processor 540 interacts with the touch-sensitive overlay via the electronic controller.

As noted above, in some example embodiments, the electronic device 501 may include a communication subsystem 511 which allows the electronic device 501 to communicate over a wireless network 519. In at least some example embodiments, the electronic device 501 may communicate with any one of a plurality of fixed transceiver base stations of the wireless network 519 within its geographic coverage area. The electronic device 501 may send and receive communication signals over the wireless network 519 after the required network registration or activation procedures have been completed.

In some example embodiments, the auxiliary input/output (I/O) subsystems 550 may include an external communication link or interface; for example, an Ethernet connection. The electronic device 501 may include other wireless communication interfaces for communicating with other types of wireless networks; for example, a wireless network such as an orthogonal frequency division multiplexed (OFDM) network. The auxiliary I/O subsystems 550 may include a vibrator for providing vibratory notifications in response to various events on the electronic device 501 such as receipt of an electronic communication or incoming phone call, or for other purposes such as haptic feedback (touch feedback).

In some example embodiments, the electronic device 501 also includes a removable memory module 530 (typically including flash memory, such as a removable memory card) and a memory interface 532. Network access may be associated with a subscriber or user of the electronic device 501 via the memory module 530, which may be a Subscriber Identity Module (SIM) card for use in a GSM network or other type of memory card for use in the relevant wireless network type. The memory module 530 is inserted in or connected to the memory interface 532 of the electronic device 501 in order to operate in conjunction with the wireless network 519.

The data port 552 may be used for synchronization with a user's host computer system (not shown). The data port 552 may enable a user to set preferences through an external device or software application and extends the capabilities of the electronic device 501 by providing for information or software downloads to the electronic device 501 other than through the wireless network 519.

In at least some example embodiments, the electronic device 501 also includes a device orientation subsystem 549, including at least one orientation sensor 551, which is connected to the processor 540 and which is controlled by one or a combination of a monitoring circuit and operating software. The orientation sensor 551 detects the orientation of the electronic device 501 or information from which the orientation of the electronic device 501 can be determined, such as acceleration. In some example embodiments, the orientation sensor 551 is an accelerometer, such as a three-axis accelerometer. An accelerometer is a sensor which converts acceleration from motion and gravity into an electrical. Accelerometers may be available in one, two or three axis configurations. Higher order axis configurations are also possible. Accelerometers may produce digital or analog output signals depending on the type of accelerometer.

An orientation sensor 551 may generate orientation data which specifies the orientation of the electronic device 501. The orientation data, in at least some example embodiments, specifies the orientation of the device 501 relative to the gravitational field of the earth.

In some example embodiments, the orientation subsystem 549 may include other orientation sensors 551, instead of or in addition to accelerometers. For example, in various example embodiments, the orientation subsystem 549 may include a gravity sensor, a gyroscope, a tilt sensor, an electronic compass or other suitable sensor, or combinations thereof. In some example embodiments, the device orientation subsystem 549 may include two or more orientation sensors 551 such as an accelerometer and an electronic compass.

The electronic device 501 may also include one or more cameras 403. The one or more cameras 403 may be of the type described above with reference to FIGS. 1 to 4 and may be capable of capturing images in the form of still photographs or motion video.

The electronic device 501 also includes or is connectable to a power source, such as a battery 538, which may be one or more rechargeable batteries that may be charged for example, through charging circuitry coupled to a battery interface 536 such as the data port 552. The battery 538 provides electrical power to at least some of the electrical circuitry in the electronic device 501, and the battery interface 536 provides a mechanical and electrical connection for the battery 538. The battery interface 536 is coupled to a regulator (not shown) which provides power V+ to the circuitry of the electronic device 501.

The electronic device 501 includes a short-range communication subsystem 562 which provides for wireless communication between the electronic device 501 and other electronic devices 501. The short-range communication subsystem 562 may be configured to allow the electronic device 501 to communicate with other electronic devices. For example, a top electronic device 102 (shown in FIGS. 1 to 4) may communicate with a bottom electronic device 104 via a short-range communication subsystem 562. That is, both the top electronic device 102 and the bottom electronic device 104 may be equipped with a short-range communication subsystem which allows these electronic devices 102, 104 to communicate with one another.

In at least some example embodiments, the short-range communication subsystem 562 is a wireless bus protocol compliant communication mechanism such as a Bluetooth® communication module to provide for communication with similarly-enabled systems and devices.

The electronic device 501 stores data 527 in an erasable persistent memory, which in one example embodiment is the flash memory 544. In various example embodiments, the data 527 includes service data including information required by the electronic device 501 to establish and maintain communication with the wireless network 519. The data 527 may also include user application data such as email messages, address book and contact information, calendar and schedule information, notepad documents, image files, and other commonly stored user information stored on the electronic device 501 by its user, and other data. The data 527 stored in the persistent memory (e.g. flash memory 544) of the electronic device 501 may be organized, at least partially, into one or more databases or data stores. The databases or data stores may contain data items of the same data type or associated with the same application. For example, email messages, contact records, and task items may be stored in individual databases within the device memory.

The processor 540 operates under stored program control and executes software modules 521 stored in memory such as persistent memory; for example, in the flash memory 544. As illustrated in FIG. 5, the software modules 521 include operating system software 523 and other software applications 525 such a stacked device positioning module 560. In the example embodiment of FIG. 5, the stacked device positioning module 560 is implemented as a stand-alone application 525. However, in other example embodiments, the stacked device positioning module 560 could be implemented as part of the operating system 523 or another application 525.

As will be described in greater detail below with reference to FIGS. 6 to 9, the stacked device positioning module 560 may be configured to allow the position of the electronic device 501 to be determined relative to another electronic device when the electronic device 501 and the other electronic device are stacked. In at least some example embodiments, when the electronic device 501 and another electronic device are stacked, the stacked device positioning module 560 may cause the electronic device 501 to operate in a complementary user interface mode. Examples of such complementary user interface modes will be described in greater detail below with reference to FIGS. 9 to 14.

The software applications 525 on the electronic device 501 may also include a range of additional applications, including for example, a notepad application, Internet browser application, voice communication (i.e. telephony) application, mapping application, or a media player application, or any combination thereof. Each of the software applications 525 may include layout information defining the placement of particular fields and graphic elements (e.g. text fields, input fields, icons, etc.) in the user interface (e.g. the display 504) according to the application.

The software modules 521 or parts thereof may be temporarily loaded into volatile memory such as the RAM 546. The RAM 546 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 501 during or after manufacture. Additional applications and/or upgrades to the operating system 523 or software applications 525 may also be loaded onto the electronic device 501 through the wireless network 519, the auxiliary I/O subsystem 550, the data port 552, the short-range communication subsystem 562, or other suitable subsystem 564. The downloaded programs or code modules may be permanently installed; for example, written into the program memory (i.e. the flash memory 544), or written into and executed from the RAM 546 for execution by the processor 540 at runtime.

One or both of the top electronic device 102 and the bottom electronic device 104 of FIGS. 1 to 4 may be an electronic device 501 of the type illustrated in FIG. 5. That is, the top electronic device 102 may include the components described above with reference to FIG. 5 or a subset thereof and the bottom electronic device 104 may also include the components described above with reference to FIG. 5 or a subset thereof.

The top electronic device 102 may, in at least some example embodiments include a different subset of the components than the bottom electronic device 104. That is, one or more of the components described with reference to FIG. 4 may not be included in the top electronic device 102 or the bottom electronic device 104 in at least some example embodiments. For example, in at least some example embodiments, the top electronic device 102 includes the camera 403 while the bottom electronic device 104 may not include a camera. Similarly, in at least some example embodiments, the bottom electronic device 104 includes a display 109 (which may be referred to as a bottom electronic device display 109A (illustrated in FIGS. 1 and 2), while the top electronic device 102 may not include a display.

The discussions which follow will refer to a number of example display screens which may, in various example embodiments, be displayed on a display 109A of a bottom electronic device 104, a display 109B of a top electronic device 104, or both. The top electronic device 102 may be configured to display the display screens which are referred to or illustrated as being provided by the top electronic device 102, and the bottom electronic device 104 may be configured to display the display screens which are referred to or illustrated as being provided by the bottom electronic device 104. More particularly, a processor 540 of the top electronic device 102 may be configured to cause the top electronic device 102 to display the display screens which are referred to or illustrated as being provided by the top electronic device 102 and a processor 540 of the bottom electronic device 104 may be configured to cause the bottom electronic device 104 to display the display screens which are referred to or illustrated as being provided by the bottom electronic device 104.

Locating Patterns

Figure 6:
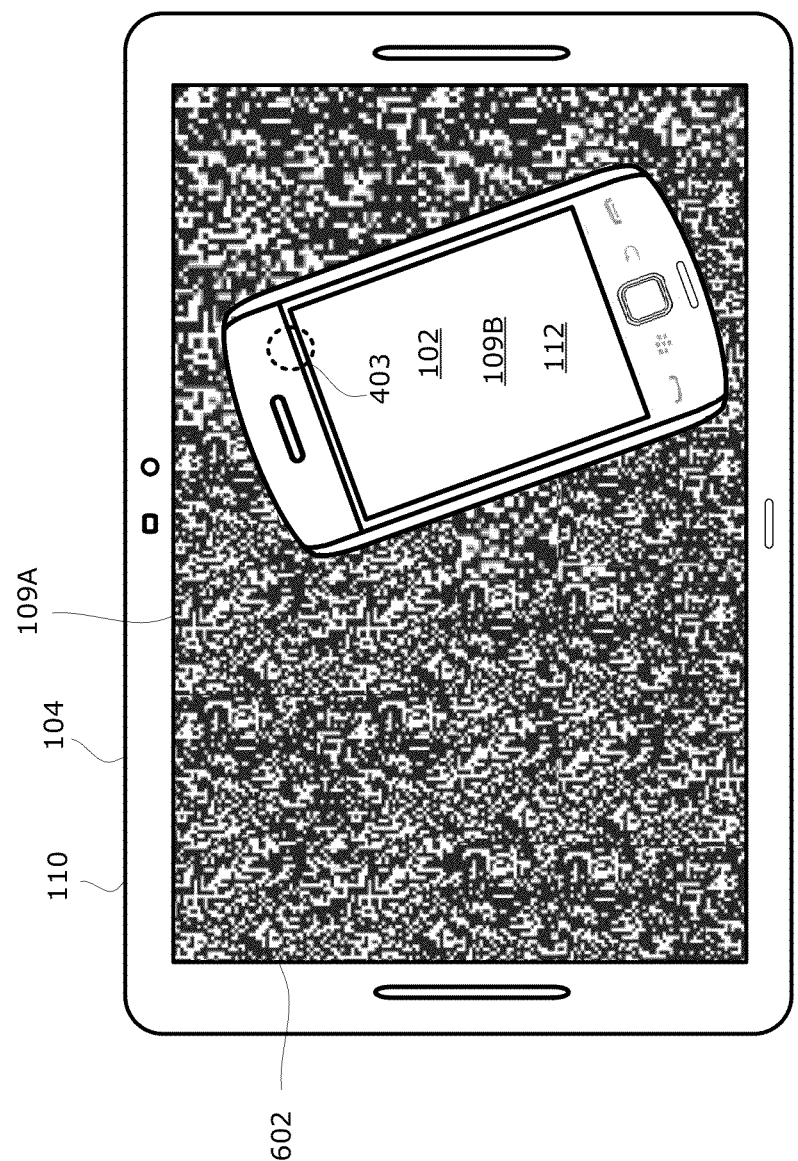
FIG. 6 is top view of a top electronic device stacked on top of a bottom electronic device which displays a locating pattern in accordance with example embodiments of the present disclosure.

Referring now to FIG. 6, a top view is shown of the top electronic device 102 and the bottom electronic device 104 in the stacked orientation described above with reference to FIGS. 1 to 3.

In the example embodiment of FIG. 6, in order to facilitate the identification of the relative position of the top electronic device 102 and the bottom electronic device 104, a locating pattern 602 is displayed on the display 109A of the bottom electronic device 104.

In the example embodiment illustrated, the locating pattern 602 occupies the entirety of the display 109A associated with the bottom electronic device 104. In the example embodiment illustrated, the top electronic device 102 obscures a portion of the display 109A of the bottom electronic device 104. While not visible from FIG. 6, the locating pattern 602 also occupies the portion of the display 109A that is obscured by the top electronic device 102.

The locating pattern 602 includes a number of unique regions. That is, the locating pattern 602 is selected such that there are portions of the locating pattern 602 that are unlike other portions of the locating pattern 602. When the camera 403 obtains camera data and the electronic devices 102, 104 are in the stacked orientation, due to the uniqueness of various regions of the locating pattern 602, the relative orientation of the top electronic device 102 and the bottom electronic device 104 may be determined. More particularly, one or both of the electronic devices 102, 104 may compare the camera data to the locating pattern 602 and may determine the region of the locating pattern 602 represented by the camera data. That is, the portion of the locating pattern corresponding to the camera data may be determined.

The locating pattern 602 is illustrated as a binary coloured image. More particularly, in the example illustrated, each pixel of the locating pattern 602 is either black or white. This binary colour scheme has been used to allow for reproduction of this document; however, in practice, a locating pattern 602 with a greater number of colours may be used. The use of a greater number of colours in the locating pattern may allow for a greater number of unique regions on the display 109A. That is, by using colour, it may be easier to produce a locating pattern 602 having very unique regions.

In some example embodiments, the locating pattern 602 may be displayed in a manner by which it is invisible to a human eye but is visible to the camera 403. Any one of a variety of techniques may be employed to ensure that the locating pattern is not visible to the human eye but is visible to the camera 403. For example, in some example embodiments, the locating pattern may be displayed at a rate that does not allow a human to perceive it but which allows the camera 403 to detect it.

Figure 7:
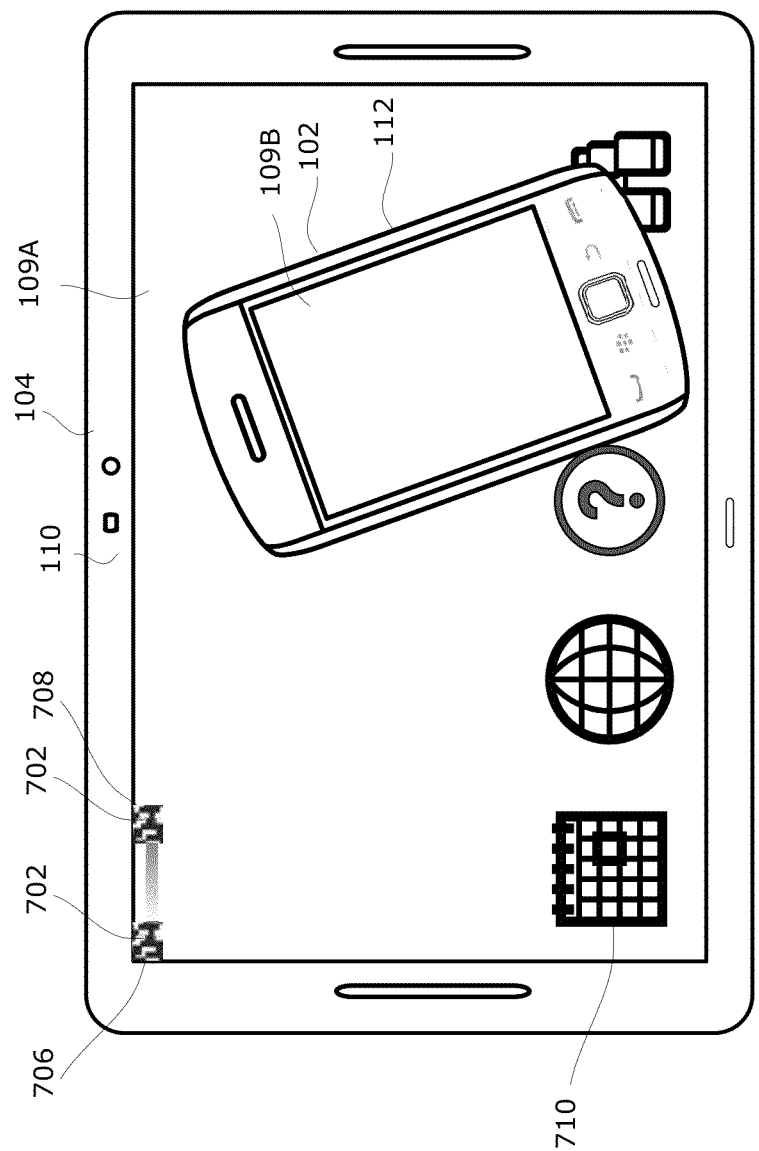
FIG. 7 is top view of a top electronic device stacked on top of a bottom electronic device which displays a locating pattern in accordance with example embodiments of the present disclosure.

Referring now to FIG. 7, a further example locating pattern 702 will now be discussed. FIG. 7 illustrates a top view of the top electronic device 102 and the bottom electronic device 104 in the stacked orientation described above with reference to FIGS. 1 to 3.

In the example embodiment of FIG. 7, the bottom electronic device 104 is configured to display a locating pattern 702 that occupies only a portion of the display 109A at any given time. The bottom electronic device 104 is configured to move the locating pattern 702 across the display 109A to allow the locating pattern 702 to occupy various portions of the display 109A. In the example illustrated, the locating pattern 702 may be displayed in a first position 706 and, sometime later, may be displayed in a second position 708.

The locating pattern 702 may be moved across the display 109A in a predetermined pattern. By way of example, it may be moved from left to right across a top row of the display 109A and may then move in a similar manner across a row below the top row and adjacent to the top row. This scanning may continue until the locating pattern 702 has scanned across the entirety of the display 109A. When the locating pattern 702 has scanned across the entirety of the display 109A, the scanning may again continue at the top row.

Thus, while the locating pattern 702 does not, at a given time, cover the entirety of the display 109A, it may be scanned across the entirety of the display 109A so that, over time, the locating pattern 702 occupies every visible region of the display 109A.

Since the locating pattern 702 only occupies a portion of the display 109A at a given time, other features 710 may be displayed on the display 109A concurrently with the locating pattern 702. In some example embodiments, the locating pattern 702 may be scanned across the display 109A while a graphical user interface associated with an active program remains displayed. In the example illustrated, a plurality of icons are displayed concurrently with the locating pattern 702.

In the example embodiment of FIG. 7, camera data received by the camera 403 of the top electronic device 102 may be compared to the locating pattern 702 to identify the position of the top electronic device 102 relative to the bottom electronic device 104. When the locating pattern 702 is detected using the camera data, the top electronic device 102 and/or the bottom electronic device 104 knows the location of the top electronic device 102 relative to the display 109A. That is, when the locating pattern 702 is detected in the camera data from the camera 403 of the top electronic device 104, the electronic devices 102, 104 may determine which region of the display 109B of the bottom electronic device displayed the locating pattern 702 at the time when it was detected to determine the lateral positioning of the top electronic device 102 relative to the bottom electronic device 104. The relative orientation of the top electronic device 102 and the bottom electronic device 104 (e.g. the angle representing the relative alignment of the electronic devices 102, 104) may also be determined by the top electronic device 102 or the bottom electronic device 104 by examining the orientation of the locating pattern 702 represented by the camera data.

In at least some example embodiments, the top electronic device 102 and/or the bottom electronic device 104 may map the display 109B (or a portion thereof) of the top electronic device 102 to a corresponding region of the display 109A of the bottom electronic device 104. More particularly, one or both of the electronic devices may identify a region of the display 109A of the bottom electronic device 102 that is aligned with the display 109B of the top electronic device 104.

Figure 8:
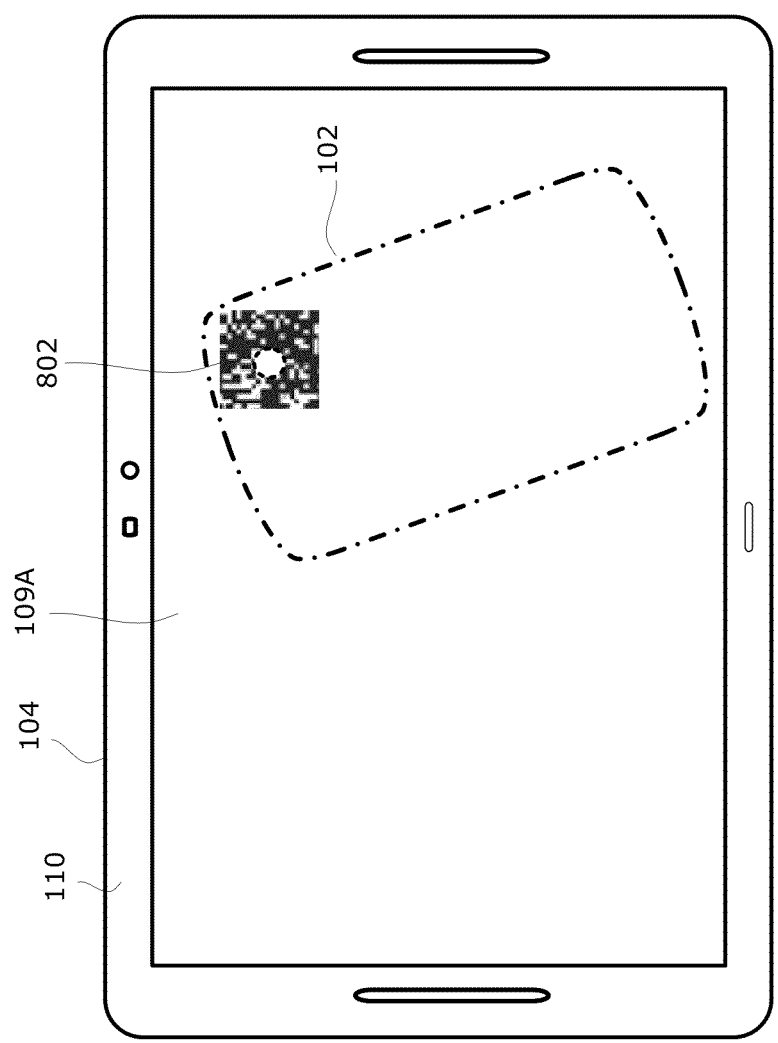
FIG. 8 is a top view of a bottom electronic device displaying a locating pattern in accordance with example embodiments of the present disclosure.

After the position of the top electronic device 102 relative to the bottom electronic device 104 is determined, in at least some example embodiments, a further locating pattern 802 may be displayed at a portion of the display 109A of the bottom electronic device 102 that is obscured by the top electronic device 104. Referring now to FIG. 8, one such example embodiment is illustrated.

FIG. 8 illustrates a top view of the top electronic device 102 and the bottom electronic device 104 in the stacked orientation described above with reference to FIGS. 1 to 3.

In the example embodiment of FIG. 8, the top electronic device 102 has been illustrated using broken lines to illustrate the location and orientation of the top electronic device 102 relative to the bottom electronic device 104 and to illustrate the portion of the display 109A of the bottom electronic device 104 that is situated under the top electronic device 104 and that would be obscured by the top electronic device 102.

The display screen illustrated in FIG. 8 may be provided after the relative position of the top electronic device 102 and the bottom electronic device 104 have been determined (e.g. using one of the techniques described with reference to FIGS. 6 and 7).

When the position of the top electronic device 102 relative to the bottom electronic device 104 has been determined, the bottom electronic device 104 has identified where the camera 403 of the top electronic device 102 is relative to the display 109A of the bottom electronic device 104. Thus, after identifying the location of the camera 403 relative to the display 109A, the locating pattern 802 may be displayed on a portion of the display 109A that is aligned, at least in part, with the camera 403 associated with the top electronic device 104.

More particularly, the bottom electronic device 104 may display the further locating pattern 802 at a region of the display 109A of the bottom electronic device 102 that is obscured by the top electronic device 102 and that is, at least in part, aligned with the camera 403 of the top electronic device 102. In at least some example embodiments, the further locating pattern 802 is displayed in a manner that would be visible to the human eye. More particularly, the further locating pattern 802 would be visible to the human eye if the top electronic device 102 was not obstructing viewing of the further locating pattern 802.

In some example embodiments, the bottom electronic device 104 may display the further locating pattern 802 on a portion of the display 109A of the bottom electronic device 104 that is aligned with the camera 403 of the top electronic device 102 and that is also aligned with a portion of the top electronic device 102 surrounding the camera 403. That is, the further locating pattern 802 may be larger in size than the camera 403 so that a movement of the top electronic device along the display 109A of the bottom electronic device 104 causes a different portion of the further locating pattern 802 to be captured by the camera 403. In at least some example embodiments, one or both of the electronic devices 102, 104 may identify such movements of the electronic device by comparing camera data to the locating pattern 802. In at least some example embodiments, in response to a movement, the further locating pattern 802 may be moved along the display 109A to remain aligned with the camera. For example, the locating pattern 802 may be moved so that it remains centered with the camera 403.

The further locating pattern 802 of FIG. 8 may in some example embodiments, be the same locating pattern 702 displayed as described above with reference to FIG. 7 or may, in other example embodiments, be a different locating pattern. In some example embodiments, the further locating pattern 802 may be the same as a portion of the locating pattern 602 described above with reference to FIG. 6 (e.g. it may be the same as the portion of the locating pattern 602 that was aligned with the camera 403).

Determining Relative Position

Figure 9:
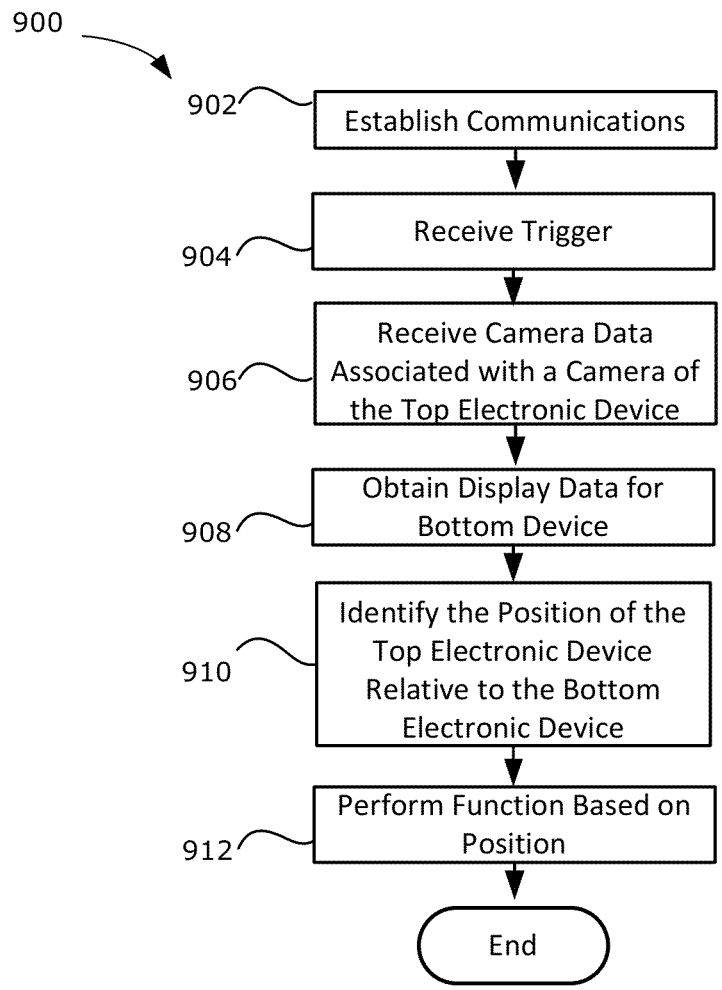
FIG. 9 is a flowchart of an example method for determining a relative position of a top electronic device stacked on top of a bottom electronic device in accordance with example embodiments of the present disclosure.

Referring now to FIG. 9, a flowchart of an example method 900 for determining a relative position of a top electronic device 102 stacked on top of a bottom electronic device 104 is illustrated. The method 900 may be performed by the top electronic device 102 or the bottom electronic device 104. That is, one or more of the electronic devices 102, 104 may be configured to perform the method 900 of FIG. 9. More particularly, the method 900 may be performed by one of the electronic devices 102, 104 in cooperation with another one of the electronic devices 102, 104.

In at least some example embodiments, the processor 540 (shown in FIG. 5) of one of the electronic devices 102, 104 is configured to perform the method 900. More particularly, in at least some example embodiments, one or more application 525 (shown in FIG. 5) or module stored in memory of the electronic device 102, 104 may be configured to perform the method 900 of FIG. 9. One or more applications 525 (shown in FIG. 5) may contain computer readable instructions which cause the processor 540 (shown in FIG. 5) of the electronic device 102, 104 to perform the method 900. In at least some example embodiments, the stacked device positioning module 560 may be configured to perform the method 900 of FIG. 9. More particularly, the stacked device positioning module 560 may include computer readable instructions which, when executed, cause the processor 540 (shown in FIG. 5) to perform the method 900 of FIG. 9.

The method 900 of FIG. 9 may, in at least some example embodiments, be provided by other software applications or modules apart from those specifically discussed above; for example, the operating system 523 (of FIG. 5). Similarly, any portion of the method 900 of FIG. 9 may be performed by or rely on other applications 525 (of FIG. 5) or modules which may interface with the stacked device positioning module 560 (of FIG. 5).

At 902, the top electronic device 102 and the bottom electronic device 104 establish communications with one another. The electronic devices 102, 104 may establish wireless communications with one another using short range communication subsystems 562 (of FIG. 5) associated with each of the electronic devices 102, 104 (these may be wireless communication subsystems). In such example embodiments, the electronic devices 102, 104 may establish wireless communications with one another when they are each physically located within a coverage area provided by the short-range communication subsystem 562 of the other of the electronic devices 102, 104.

In at least some example embodiments, at 902, the electronic devices 102, 104 may connect via a Bluetooth™ connection. In other example embodiments, other connection protocols may be used. In at least some example embodiments, the electronic devices 102, 104 may connect together directly (e.g. using compatible short-range communication subsystems 562). In other example embodiments, the electronic devices 102, 104 may connect together through one or more server or network. In at least some example embodiments, the electronic devices 102, 104 may connect together via a Wi-Fi™ connection.

In at least some example embodiments, in order to connect, the electronic devices 102, 104 may undergo a pairing process. A pairing process allows a user to control which electronic devices 102, 104 are permitted to connect with one another. In at least some example embodiments, the pairing process may be completed once in order to establish a relationship between two electronic devices 102, 104. After the pairing process is completed, the paired electronic devices 102, 104 have a relationship in which those electronic devices 102, 104 are able to perform more advanced communications with one another.

The pairing process is an additional level of security which ensures that the users associated with a pair of electronic devices 102, 104 would like those electronic devices 102, 104 to be able to communicate with one another. When electronic devices 501 have been paired, they may be referred to as bonded electronic devices 102, 104.

The pairing process may be triggered by a specific request from a user to create a bond. For example, a user may select an option to pair an electronic device to another electronic device using a user interface associated with one of the electronic devices. The pairing process may involve user interaction to ensure that users of each electronic device 102, 104 confirm that the electronic devices 102, 104 are to be paired. In at least some example embodiments the pairing process may ensure that the positional tracking of stacked electronic devices only occurs when the electronic devices 102, 104 are paired. That is, the positional tracking will only occur if the electronic devices 102, 104 have mutually authenticated one another (i.e. through the pairing process).

During the pairing process, the electronic devices 102, 104 establish a shared secret, which may be referred to as a link key. The link key is stored by both electronic devices 102, 104 which are paired on bonded. Once the pairing process is completed, a bond is formed between the electronic devices which enables those electronic devices to connect to each other in the future without requiring the pairing process in order to confirm the identity of the devices. At the request of a user of either of the electronic devices, this bond can later be severed.

Accordingly, in at least some example embodiments, at 902, two or more electronic devices 501 which have previously undergone a pairing process are communicably connected to one another. That is, the electronic devices 102, 104 establish wireless communications so that data may be shared between the electronic devices 102, 104.

In at least some example embodiments, an operating system 523 or a communication module (such as a Bluetooth™ module) provided on the electronic devices 102, 104 may be configured to perform 902 of FIG. 9.

In at least some example embodiments, at 904 one or more of the electronic devices 102, 104 on which wireless communications were established at 902 monitors to determine whether one or more predetermined trigger conditions have occurred. That is, in at least some example embodiments, the electronic devices 102, 104 are configured to only begin trying to determine the relative positioning of the top electronic device 102 and the bottom electronic device 104 if the predetermined trigger condition(s) has occurred.

In at least some example embodiments, the predetermined trigger condition may be a condition which indicates that the top electronic device 102 is (or may be) stacked upon the bottom electronic device 104. Accordingly, in at least some example embodiments, at 903, one or both of the electronic devices 102, 104 attempt to determine whether the electronic devices 102, 104 are in the stacked orientation. By way of example, in at least some example embodiments, the electronic devices 102, 104 compare their orientations specified by their respective orientation subsystems 549 (of FIG. 5). More particularly, the orientation data from the orientation subsystem 549 of the top electronic device 102 may be compared to orientation data from the orientation subsystem 549 of the bottom electronic device 102. In order to make this comparison, one of the electronic devices 102, 104 may provide orientation information defining the orientation of that electronic device 102, 104 to the other of the electronic devices 102, 104 (e.g. via the short-range communication subsystem 562). The electronic device 102, 104 receiving the orientation information from the other electronic device 102, 104 may compare that orientation information to orientation data from its own orientation subsystem 549 to determine whether the electronic devices 102, 104 are oriented in the stacked orientation. By way of example, in some example embodiments, an electronic device 102, 104 may determine that the electronic devices 102, 104 are in the stacked orientation if the orientation data from the orientation subsystems 549 of both electronic devices 102, 104 suggests that both electronic devices 102, 104 are oriented along a common plane.

In some example embodiments, one or more of the predetermined trigger conditions may be a user input. For example, the predetermined trigger condition may be the activation of one or more interface elements associated with one or more of the electronic devices 102, 104. For example, in at least some example embodiments, each electronic device may display a selectable interface element, such as an icon which a user may select to instruct the electronic devices 102, 104 to begin trying to determine the relative positions of stacked electronic devices 102, 104.

Accordingly, in at least some example embodiments, at 904 a trigger corresponding to a predetermined trigger condition indicating that the electronic devices may be in a stacked orientation may be received and may cause the electronic devices 102, 104 to begin to determine their relative positions.

At 906, camera data associated with a camera 403 of the top electronic device 102 is received. The manner by which such camera data is received may vary depending on whether the top electronic device 102 or the bottom electronic device 104 is performing the method 900. That is, the manner by which the camera data is received may depend on which of the electronic devices 102, 104 is determining the relative positioning of the electronic devices 102, 104.

Where the method 900 is performed by the top electronic device 102, then the top electronic device 102, which is equipped with the camera 403, receives the camera data from the camera 403. Where the method 900 is performed by the bottom electronic device 104, the bottom electronic device 104 receives the camera data from the top electronic device 102 via a communication subsystem associated with the bottom electronic device 104 (such as the short-range communication subsystem 562 of FIG. 5). That is, where the method 900 is performed by the bottom electronic device 104, the top electronic device 102 may be configured to send the camera data to the bottom electronic device 104.

In some example embodiments, prior to receiving the camera data, the top electronic device 102 may be configured to automatically adjust the camera 403 to a macro-focus position. In the macro-focus position, a focussing lens associated with the camera is moved to a position suitable for focussing on subjects near the camera 403.

At 908, display data identifying a pixel arrangement on at least a portion of the display 109A of the bottom electronic device 104 is obtained. The manner by which such display data is obtained may vary depending on whether the top electronic device 102 or the bottom electronic device 104 is performing the method 900. Where the method 900 is performed by the bottom electronic device 104, the display data is known to the bottom electronic device 104. Accordingly, in some such example embodiments, the display data may be obtained from memory (such as a cache) or from a video processing unit.

Where the method 900 is performed by the top electronic device 102, the top electronic device 102 receives the display data from the bottom electronic device 104 via a communication subsystem associated with the top electronic device 102 (such as the short-range communication subsystem 562 of FIG. 5). That is, where the method 900 is performed by the top electronic device 102, the bottom electronic device 104 may be configured to send the display data to the top electronic device 102.

As noted in the discussions of FIGS. 6 to 8, in some example embodiments, the bottom electronic device 104 may display a locating pattern on at least a portion of the display 109A of the bottom electronic device 104. The locating pattern may, for example, be a locating pattern 602, 702 or 802 of a type described above with reference to FIGS. 6 to 8. Where the bottom electronic device 104 is configured to display a locating pattern 602, 702 or 802, the display data may include information about the locating pattern. For example, where a locating pattern 602 of the type described above with reference to FIG. 6 is displayed (e.g. where the locating pattern occupies the entirety of the display for at least a brief period of time), the display data may be the locating pattern itself 602. That is, the display data may define the specific arrangement of pixels represented by the locating pattern 602 on the display 109A.

Where a locating pattern 702 or 802 of the type described with reference to FIG. 7 or 8 is used (e.g. where the locating pattern occupies only a portion of the display 109A at a given time), the display data may define the arrangement of pixels provided by the locating pattern and may also include location information specifying the location of the locating pattern on the display 109A.

At 910, the position of the top electronic device relative to the bottom electronic device is identified based on the camera data received at 906 and the display data obtained at 908. More particularly, at 910, the top electronic device 102 and/or the bottom electronic device 104 identifies a portion of the display 109A represented by the camera data.

In some example embodiments where a locating pattern 602 of the type described with reference to FIG. 6 is displayed on the display 109A of the bottom electronic device 104 (i.e. where the locating pattern occupies the entirety of the display), at 910 the portion of the locating pattern corresponding to the camera data is identified. That is, the camera data is compared to the locating pattern to identify the portion of the locating pattern represented by the camera data.

In some example embodiments, where a locating pattern 702 of the type described with reference to FIG. 7 is displayed on the display 109A of the bottom electronic device 104 (i.e. where the locating pattern occupies only a portion of the display), at 910 the camera data is compared to the locating pattern to determine whether the camera data represents the locating pattern (or a portion thereof). That is, one or both of the electronic devices 102, 104 determines whether the camera 403 has captured the locating pattern (or a portion thereof). Based on the position of the locating pattern 702 on the display 109A when the camera 403 captured the locating pattern, the position of the top electronic device 102 relative to the bottom electronic device 104 is determined.

Accordingly, using the camera data and the display data, the position of the top electronic device 102 relative to the bottom electronic device 104 is determined. In at least some example embodiments, the top electronic device 102 and/or the bottom electronic device 104 may map the display 109B (or a portion thereof) of the top electronic device 102 to a corresponding region of the display 109A of the bottom electronic device 104. More particularly, one or both of the electronic devices may identify a region of the display 109A of the bottom electronic device 102 that is aligned with the display 109B of the top electronic device 104. In order to make this determination, it at least some example embodiments, the top electronic device 102 and/or the bottom electronic device 104 may access top electronic device form factor information. The top electronic device form factor information specifies dimensions of the top electronic device 102. For example, the top electronic device form factor information may specify the position of the camera 403 relative to other features of the top electronic device 102 (such as the display 109B). The top electronic device form factor information may, for example, specify the size of the display 109B of the top electronic device 102. In at least some example embodiments, the top electronic device form factor information may be stored in memory of one or more of the electronic devices 102, 104.

In some example embodiments, at 910, a relative orientation of the electronic devices 102, 104 may be determined. The relative orientation of the electronic devices may be specified as an angle. For example, the relative orientation may specify the degree to which the top electronic device 102 is askew when compared with the bottom electronic device 104. For example, the orientation may specify the degree to which the top electronic device 102 is away from a portrait orientation (or a landscape orientation) when its orientation is considered relative to that of the bottom electronic device 104.

In some example embodiments, at 910, the top electronic device 102 and/or the bottom electronic device 104 may identify a region of the display 109A of the bottom electronic device 104 that is obscured by the top electronic device 104. This may be determined based on the camera data, the display data, and also based on top electronic device form factor information that identifies the position of the camera 403 relative to the extremities of the top electronic device 102.

After the position of the top electronic device 102 relative to the bottom electronic device 104 is identified, a function may be performed on one or both of the electronic devices 102, 104 based on that position (at 912).

For example, a function may be performed on one or both of the electronic devices 102, 104 based on any one or a combination of: the relative orientation of the electronic devices, the portion of the display 109A of the bottom electronic device that is obscured by the top electronic device 102, the portion of the display 109A of the bottom electronic device 104 that is covered by the display 109B of the top electronic device 102, or the lateral position of the camera 403 or any other predetermined features of the top electronic device 102 relative to the bottom electronic device 104.

By way of example, in one example embodiment in which the relative orientation of the top electronic device 102 and the bottom electronic device 104 is determined, one or both of the electronic devices 102 may determine whether the relative orientation satisfies first predetermined criteria and, if so, may perform a first function on one or both of the top electronic device 102 and the bottom electronic device 104. Similarly, in some such example embodiments, one or both of the electronic devices 102 may determine whether the relative orientation satisfies second predetermined criteria and, if so, may perform a second function on one or both of the top electronic device 102 and the bottom electronic device 104. The first predetermined criteria and/or the second predetermined criteria may be an orientation or a range of orientations. For example, in at least some example embodiments, such predetermined criteria may specify an angle (or range of angles) at which the electronic devices 102, 104 must be positioned relative to one another.

In at least some example embodiments, the first function may be performed by implementing a first preference profile and the second function may be performed by implementing a second preference profile on one or both of the electronic devices 102, 104. The preference profiles may, for example, specify configuration settings for the top electronic device 102 and/or the bottom electronic device 104. Thus, by changing the orientation of the top electronic device 102 relative to the bottom electronic device 104, a preference profile may be set.

For example, an alarm may be set to a quiet mode when the relative orientation satisfies the first predetermined criteria and the alarm may be set to an audible mode when the relative orientation satisfies the second predetermined criteria.

Where the top electronic device displays a display screen that is related to a display screen associated with the bottom electronic device, the top electronic device may receive the display screen or data that may be used to generate the display screen from the bottom electronic device via the communication subsystem 562. That is, the bottom electronic device 104 may transmit the display screen (or data that may be used to generate the display screen) to the top electronic device 102 via its communication subsystem.

Accordingly, in at least some example embodiments, the complementary user interface mode that may be provided at 912 may allow the top electronic device 102 to display a display screen that is related to a display screen displayed on the bottom electronic device. That is, in at least some example embodiments, the complementary user interface mode may allow the displays 109A, 109B to complement one another. Similarly, in some example embodiments, the complementary user interface mode may allow one or more input interfaces 506 (FIG. 5) associated with one or both of the electronic devices to provide complementary functions.

For example, as noted above, in some example embodiments, at 910, the top electronic device 102 and/or the bottom electronic device 104 may identify a region of the display 109A of the bottom electronic device 104 that is obscured by the top electronic device 102. In at least some such example embodiments where the display 109A of the bottom electronic device 104 is touch sensitive, the bottom electronic device 104 may, at 912, define one or more input regions near the obscured region of the display 109A that may be used for providing a complementary function. More specifically, the one or more input regions may be used for inputting a command to the bottom electronic device 104 to command the bottom electronic device 104 to perform a function that engages the top electronic device 102. That is, a predetermined gesture applied (at least in part) to the input region may be associated with a function that engages the top electronic device 102.

Since the input region(s) are selected to be near the top electronic device 102, the input regions may be defined based on the identified position of the top electronic device 102 relative to the bottom electronic device 104.

In at least some example embodiments (not illustrated in FIG. 9) after the position of the top electronic device 102 has been determined relative to the bottom electronic device 102 (i.e. after 910 has been performed), a further locating pattern 802 of the type described above with reference to FIG. 8 may be displayed on the display 109A of the bottom electronic device 104. This further locating pattern 802 may be displayed on a portion of the display 109A that is obscured by the top electronic device 102.

Alternate Map View

In at least some example embodiments, at 912 of FIG. 9, a complementary user interface mode may be provided on the top electronic device 102 and/or the bottom electronic device 104 based on the identified position (e.g. based on the position of the top electronic device 102 relative to the bottom electronic device 104 as identified at 910 of FIG. 9). As noted above, in some example embodiments, in the complementary user interface mode, the top electronic device 102 and the bottom electronic device may display related content, but may display different layers of data. In at least some example embodiments, the complementary user interface mode may be provided by displaying, on a display 109B of the top electronic device 102, a display screen having one or more features aligned with features on a display screen displayed on the display 109A of the bottom electronic device. An example of one such example embodiment is illustrated in FIG. 10 and will be discussed in greater detail below.

Figure 10:
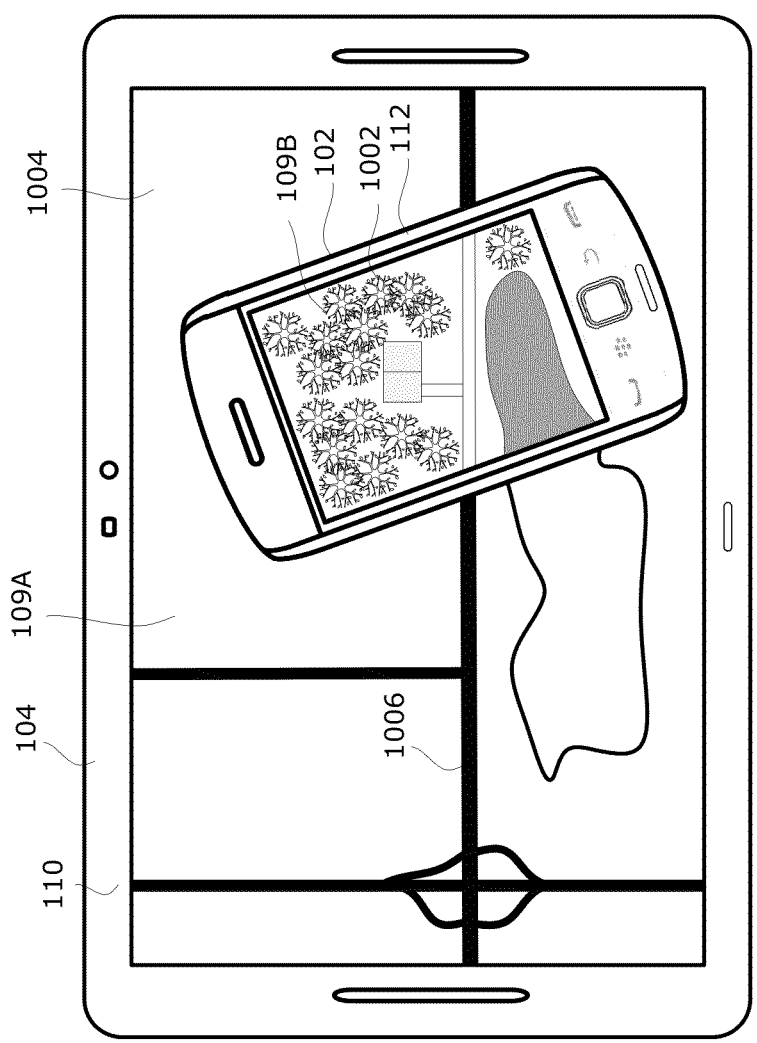
FIG. 10 is a top view of a top electronic device stacked on top of a bottom electronic device in accordance with example embodiments of the present disclosure.

Referring now to FIG. 10, an example of a complementary user interface mode will be described. In FIG. 10, example display screens 1002, 1004 are illustrated. As shown, the display screen 1002 of the top electronic device 102 is aligned with the display screen 1004 of the bottom electronic device 104. The top electronic device 102 displays a different layer of data than the bottom electronic device 104. That is, the display screen 1002 of the top electronic device 102 represents data of a type that is not illustrated in the display screen 1004 of the bottom electronic device 104.

In some example embodiments, at 912, the complementary user interface mode may be provided so that a portion of a display screen meant for display on the display 109A of the bottom electronic device 104 that is obscured by the top electronic device 102 is displayed on a display 109B of the top electronic device 102. In at least some example embodiments, one or both of the electronic devices 102, 104 may identify a portion of the display 109A of the bottom electronic device 104 that is aligned with a display 109B of the top electronic device 102 and may display, on the display 109B of the top electronic device content extracted from a display screen intended for display on the identified portion of the display 109A of the bottom electronic device 104.

In some example embodiments, the top electronic device 102 may have a display 109B that has a greater pixel density than the display 109A of the bottom electronic device 104. Thus, the top electronic device 102 may be used to provide an enhanced viewing environment of content on the bottom electronic device 104.

In some example embodiments, such as that illustrated in FIG. 10, the complementary user interface mode may allow one of the electronic devices 102, 104 to display a layer of data that is not displayed on the display of the other of the electronic devices 102, 104.

That is, in at least some example embodiments, at 912, the top electronic device may display, on its display 109B, a display screen having one or more features that are aligned with features displayed on a display screen displayed on the display 109A of the bottom electronic device. The display screen on the display of the top electronic device may display a layer of data that is not displayed on the display screen of the bottom electronic device 104.

For example, the top electronic device 102 and the bottom electronic device 104 may display different views of a map (i.e. one of the electronic devices 102, 104 may display a first view and the other of the electronic devices 102, 104 may display a second view). For example, one of the electronic devices 102, 104 may display a traditional map view and the other of the electronic devices 102, 104 may display a satellite map view.

For example, in the example embodiment illustrated, the top electronic device 102 and the bottom electronic device 104 display different views of a map, but the maps on both of the electronic devices 102, 104 are aligned. In the illustrated example, a traditional map view is provided on the display screen 1004 displayed on the display 109A of the bottom electronic device 104 and a satellite map view is provided on the display screen 1002 on the display 109B of the top electronic device 102. At least some of the features of the map are continuous across the displays 109A, 109B. For example, a portion of a road 1006 is represented on the display screen 1004 provided on the bottom electronic device 104 and another portion of the same road is represented on the display screen 1002 provided on the top electronic device 102.

The display screen 1002 displayed on the top electronic device 102 is created based on the relative positioning of the electronic devices. Accordingly, in at least some example embodiments, the display screen 1002 associated with the top electronic device 102 is displayed after the relative position of the top electronic device 102 and the bottom electronic device 104 has been determined (e.g. according to a method described above). In at least some example embodiments, the display screen 1002 associated with the top electronic device may be displayed at 912 of FIG. 9.

Common Content

Figure 11:
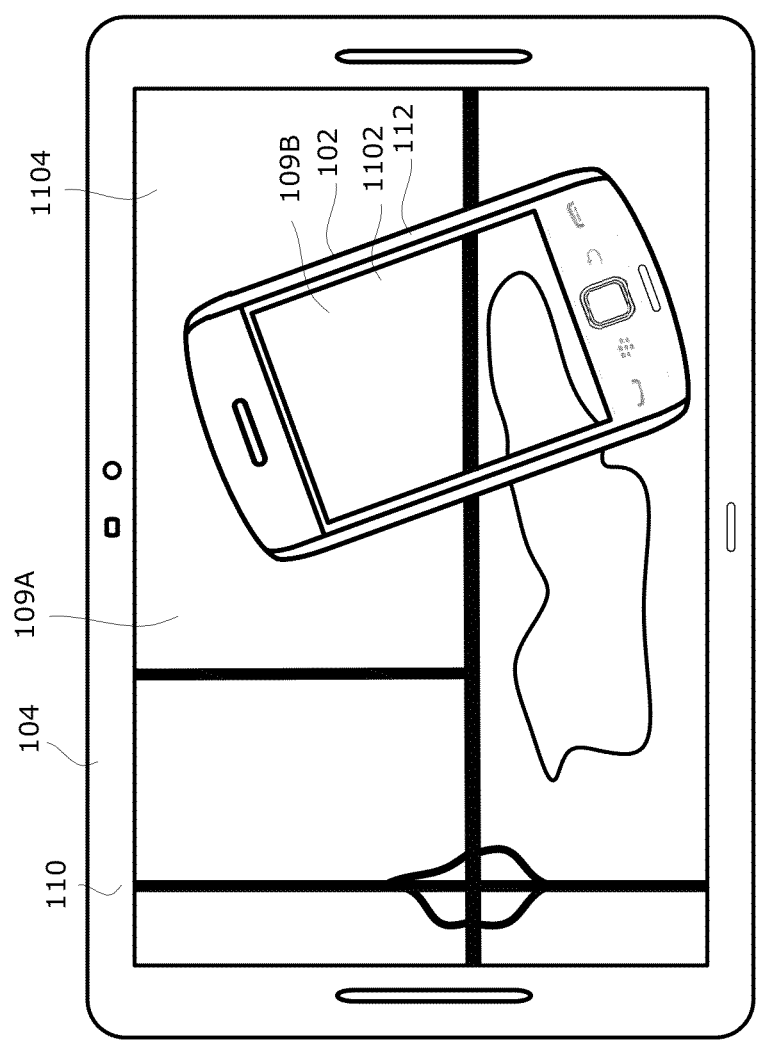
FIG. 11 is a top view of a top electronic device stacked on top of a bottom electronic device in accordance with example embodiments of the present disclosure.

Referring now to FIG. 11, further example display screens 1102, 1104 are illustrated. The further display screens 1102, 1104 illustrate a further complementary user interface mode. In the example embodiment illustrated in FIG. 11, the top electronic device effectively displays content which was intended for display on the display of the bottom electronic device but which is not viewable by a user on the display of the bottom electronic device due to the presence of the top electronic device.

As shown, the display screen 1102 of the top electronic device 102 is aligned with the display screen 1104 of the bottom electronic device. The display screens 1102, 1104 appear continuous. That is, features provided on the displays may be continuous across the displays. In the example illustrated in FIG. 11, the display screens 1102, 1104 display a common layer of data. That is, the display screens 1102, 1104 display data of a similar type; in the example shown, both display screens 1102, 1104 display a traditional map view.

The example embodiment of FIG. 11 may, for example, be used where the display 109B of the top electronic device 120 has a greater pixel density than the display 109A of the bottom electronic device 104. Such example embodiments may allow a user to utilize the top electronic device to provide a superior viewing experience. For example, the top electronic device 102 could be placed over a photograph displayed on the bottom electronic device 104 to allow the photograph to be displayed at a better pixel density.

In some example embodiments, the bottom electronic device 104 may provide the top electronic device 102 with the display screen 1102 or with information that may be used to generate the display screen 1102 (e.g. via a short-range communication subsystem 562).

The display screen 1102 displayed on the top electronic device is created based on the relative positioning of the electronic devices. Accordingly, in at least some example embodiments, the display screen 1102 associated with the top electronic device 102 is displayed after the relative position of the top electronic device 102 and the bottom electronic device 104 has been determined (e.g. according to a method described above). In at least some example embodiments, the display screen 1102 associated with the top electronic device may be displayed at 912 of FIG. 9.

Magnified View

By way of further example, as will be discussed in greater detail below with reference to FIG. 12, in some example embodiments, the top electronic device 102 may effectively act as a magnifier for the bottom electronic device 104 when a complementary user interface mode is provided. That is, at 912 of FIG. 9, the top electronic device may display a display screen on the display 109B of the top electronic device 102 that provides a magnified view of a portion of a display screen associated with the bottom electronic device 104. In some example embodiments, the display screen displayed on the display 109B of the top electronic device may provide a magnified view of a portion of the display screen of the bottom electronic device that is not visible due to the presence of the top electronic device. That is, the display screen on the display 109B of the top electronic device may appear to magnify something intended for display on the region of the display 109A of the bottom electronic device that is obscured by the top electronic device.

Figure 12:
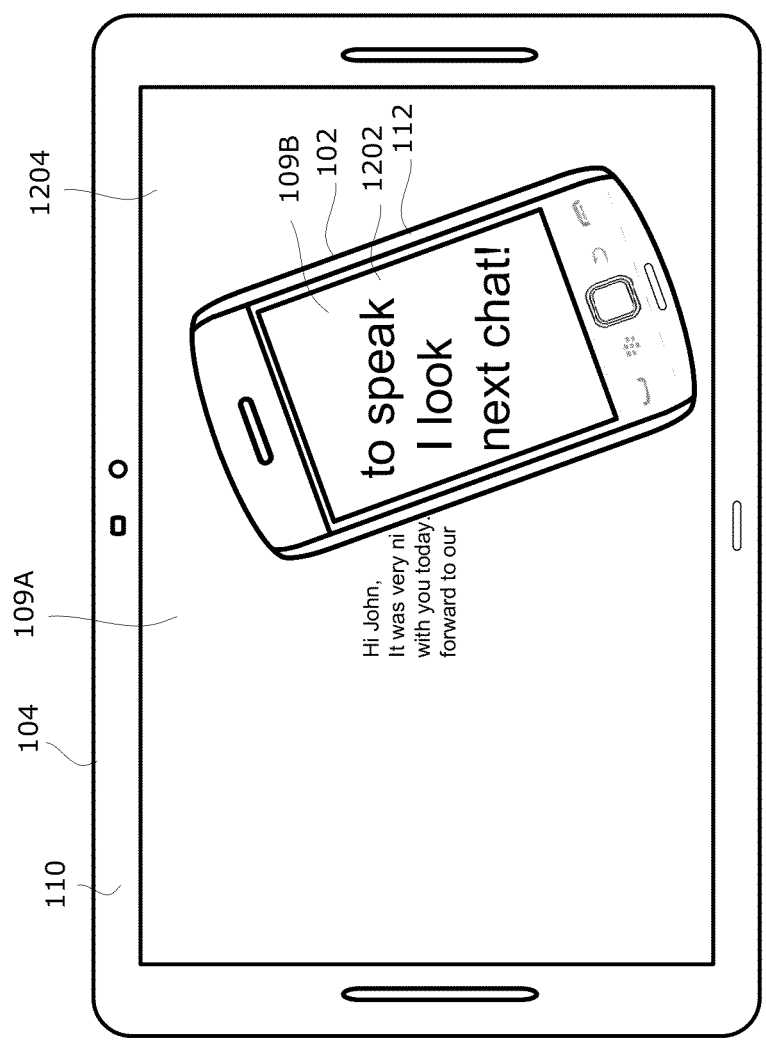
FIG. 12 is a top view of a top electronic device stacked on top of a bottom electronic device in accordance with example embodiments of the present disclosure.

Referring now to FIG. 12, as noted previously, in one example embodiment, the top electronic device may effectively act as a magnifier for the bottom electronic device 104. That is, the top electronic device may display a display screen 1202 on the display 109B of the top electronic device 102 that provides a magnified view of a portion of a display screen 1204 associated with the bottom electronic device 104. In some example embodiments, the display screen displayed on the display 109B of the top electronic device may provide a magnified view of a portion of the display screen of the bottom electronic device that is not visible due to the presence of the top electronic device. That is, the display screen on the display 109B of the top electronic device may appear to magnify something intended for display on the region of the display 109A of the bottom electronic device but that is not visible directly on the display 109A of the bottom electronic device by a user due to the presence of the top electronic device.

In the example embodiment illustrated, the display screen 1202 of the top electronic device 102 provides a magnified view of content intended for display on the display screen 1204 of the bottom electronic device. In the example illustrated, the display screen of the bottom electronic device includes the text: "Hi John, it was very nice to speak with you today. I look forward to our next chat." A portion of this text is obscured by the top electronic device 104. The top electronic device displays a portion of the obscured text at a higher font size than is used on the display screen 1204 of the bottom electronic device.

The display screen 1202 displayed on the top electronic device is created based on the relative positioning of the electronic devices. Accordingly, in at least some example embodiments, the display screen 1202 associated with the top electronic device 102 is displayed after the relative position of the top electronic device 102 and the bottom electronic device 104 has been determined (e.g. according to a method described above). In at least some example embodiments, the display screen 1202 associated with the top electronic device may be displayed at 912 of FIG. 9.

Sending a File to a Recipient

Figure 13:
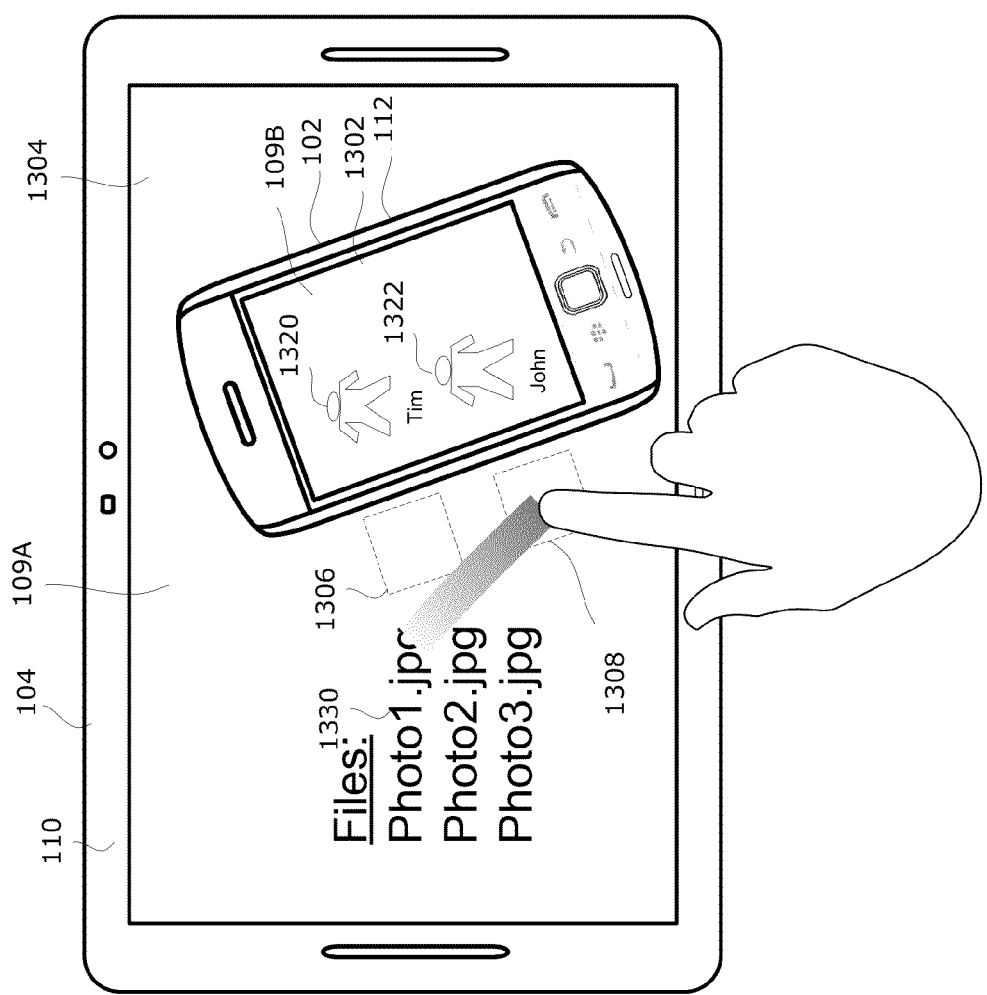
FIG. 13 is a top view of a top electronic device stacked on top of a bottom electronic device in accordance with example embodiments of the present disclosure.

Referring now to FIG. 13, an example of a further complementary user interface mode will be described. FIG. 13 illustrates example display screens 1302, 1304 associated with a top electronic device 102 and a bottom electronic device 104.

In some example embodiments, a plurality of input regions adjacent to the top electronic device 102 may be defined (at 912 of FIG. 9) for the display 109A of the bottom electronic device 104. Each of these input regions may be associated with a different function or feature. The function or feature associated with an input region may correspond to an identifier displayed on a region of the display of the top electronic device 102 that is near that input region. That is, the function associated with each input region may be selected based on the arrangement of a display screen displayed on the display 109B of the top electronic device 102.

For example, as will be described in greater detail below with reference to FIG. 13, in one operating mode, a plurality of contact identifiers are displayed on the display of the top electronic device 102 and the function that is performed in response to input received at the touchscreen display of the bottom electronic device may depend on the contact identifier that is nearest the input. That is, in one operating mode, the function associated with an input region is selected based on the contact identifier that is nearest the input region.

Accordingly, in some example embodiments, a plurality of input regions 1306, 1308 may be defined based on the position of the top electronic device 102 relative to the bottom electronic device 104. While broken lines have been used for the purposes of identifying the input regions 1306, 1308 in FIG. 13, in practice, the boundaries of the input regions may not be identified on the display 109A. The input regions 1306, 1308 are, in the example illustrated, oriented in alignment with the form factor of the top electronic device 104. That is, in the example illustrated, the input regions are parallel to a side of the top electronic device. The input regions are located near the top electronic device.

In the example embodiment of FIG. 13, a plurality of identifiers 1320, 1322 are displayed on the display 109B of the top electronic device 102. In the example embodiment illustrated, the identifiers 1320, 1322 are contact identifiers, each identifying a separate contact (these contacts may, in at least one operating mode, be contacts involved in a teleconference with the user of the electronic devices 102, 104).

A file, folder or content may be identified on the display 109A of the bottom electronic device using one or more identifiers 1330.

When an input of a predetermined type is received at a touchscreen display of the bottom electronic device and the input is received, at least in part at one of the input regions 1306, 1308, the function that is performed in response to the input may depend on the identifier 1320, 1320 that is nearest the input. That is, if the input engages the first input region 1306, then a function associated with the first identifier 1320 may be performed but if the input engages the second input region 1308 then a function associated with the second identifier 1322 may be performed.

In one operating mode, the function associated with an input region of the bottom electronic device is selected based on the identifier 1320, 1322 displayed on the top electronic device 102 at a location that is nearest the input region.

By way of example, in the example embodiment illustrated, a swipe gesture may be performed to send a file to a contact (e.g. via email, etc.). The contact to which the file will be sent is selected based on the input region where the swipe gesture ended. If the swipe gesture ends in the first input region 1306, then the file is sent to a contact identified by a first identifier 1320 and if the swipe gesture ends in the second input region 1308, then the file is sent to a contact identified by a second identifier 1322.

As illustrated in FIG. 13, in at least some example embodiments, when the electronic devices 102, 104 are in the stacked orientation, the top electronic device 102 may display content so that it is oriented in alignment with the bottom electronic device. For example, such content may be displayed parallel to a side of the display of the bottom electronic device and may not be parallel to a side of the display of the top electronic device. Accordingly, in at least some example embodiments, the orientation of text and other content displayed on the top electronic device may depend on the identified position of the top electronic device relative to the bottom electronic device.

Cut and Paste Between Devices

In at least some example embodiments, a swipe gesture performed on the display 109A of the bottom electronic device 104 may be associated with a complementary function if the swipe gesture engages one or more of the input regions. For example, a swipe gesture that ends in the identified input region (i.e. a swipe gesture that ends near the top electronic device 102) may cause a function to be performed that engages the top electronic device 104. By way of example, a file, folder, or content such as text or an image (or an identifier of a file, folder or content) may be displayed on the display 109A of the bottom electronic device and may be dragged to one or more of the identified input regions using an input interface. That is, it may be dragged to a position adjacent to the top electronic device 102. In response, the file, folder or content may be moved or copied to the top electronic device 102.

An example of the use of such a technique to achieve cutting and pasting of content will be described below with reference to FIG. 14. In such example embodiments, the identified input region of the display 109A of the bottom electronic device 104 may be referred to as a paste area (since content dragged to that area causes the content to be pasted onto the display 109B of the top electronic device 104).

Figure 14:
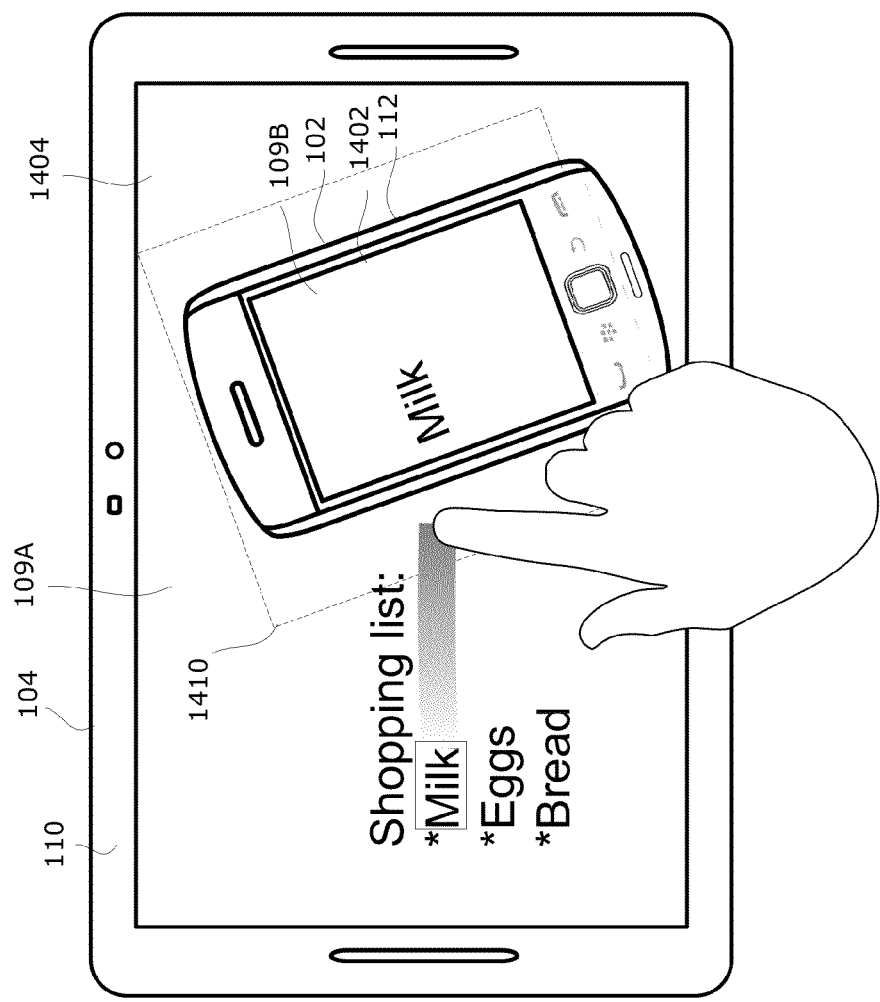
FIG. 14 is a top view of a top electronic device stacked on top of a bottom electronic device in accordance with example embodiments of the present disclosure.

Referring now to FIG. 14, an example of a further complementary user interface mode will be described. FIG. 14 illustrates example display screens 1402, 1404 associated with a top electronic device 102 and a bottom electronic device 104.

As noted in the discussion of FIG. 9 above, in some example embodiments, an input region which may be referred to as a paste area 1410 may be defined based on the position of the top electronic device 102 relative to the bottom electronic device 104. While broken lines have been used for the purposes of identifying the paste area 1410 in FIG. 14, in practice, the boundaries of the paste area may not be identified on the display 109A. The paste area 1410 is, in the example illustrated, oriented in alignment with the form factor of the top electronic device 104. That is, in the example illustrated, the paste area 1410 has one or more sides that are parallel to one or more sides of the top electronic device.

In the example embodiment of FIG. 14, content, such as text, is displayed on the display 109A of the bottom electronic device 104. A selection of content may be received at the bottom electronic device 104 (e.g. in the example embodiment illustrated the selected content "Milk" is highlighted) via an input interface 506 (FIG. 5) of the bottom electronic device 104. Input associated with the selected content may then be received via the paste area 1410. For example, in the example embodiment illustrated, a swipe gesture drags the selected content to the paste area 1410. That is, a swipe gesture occurs which begins at or near the selected content and that ends in the paste area 1410.

In response to receiving the input associated with the selected content via the paste area 1410, the selected content may be transmitted to the top electronic device 102 from the bottom electronic device 104. On the top electronic device, the received content may be displayed on the display of the top electronic device and may automatically be selected so that it may be dragged to a desired position on a document active on the top electronic device 102.

In one operating mode, the function associated with an input region of the bottom electronic device is selected based on the identifier displayed on the top electronic device at a location that is nearest the input region.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

Furthermore, methods and electronic devices for providing display screens of the types described above are considered to be within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present disclosure are not limited to any particular operating system, system architecture, mobile device architecture, server architecture, or computer programming language.

The various example embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described example embodiments may be selected to create alternative embodiments included of a sub-combination of features which may not be explicitly described above. In addition, features from one or more of the above-described example embodiments may be selected and combined to create alternative embodiments included of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor implemented method of identifying a location of a top electronic device stacked on top of a bottom electronic device, the top electronic device and the bottom electronic device being configured to communicate, the method comprising:
    receiving, at the processor, camera data associated with a camera of the top electronic device, the camera being mounted on a bottom of the top electronic device and facing a display on a top surface of the bottom electronic device when the top electronic device is stacked on top of the bottom electronic device;
    obtaining, by the processor, display data identifying a pixel arrangement on at least a portion of the display of the bottom electronic device, the display data comprising information about a locating pattern which occupies the entirety of the display of the bottom electronic device;
    identifying, by the processor, the position of the top electronic device relative to the bottom electronic device based on the camera data and the display data, wherein identifying the position of the top electronic device relative to the bottom electronic device based on the camera data and the display data comprises identifying the portion of the locating pattern corresponding to the camera data; and
    after the position of the top electronic device has been identified relative to the bottom electronic device, displaying a further locating pattern on a portion of the display of the bottom electronic device that is obscured by the top electronic device, and wherein the further locating pattern does not occupy the entirety of the display of the bottom electronic device and wherein the further locating pattern is only displayed at a portion of the display of the bottom electronic device that is obscured by the top electronic device,
wherein, in response to a movement of the top electronic device with respect to the bottom electronic device, the further locating pattern moves along the display of the bottom electronic device to remain aligned with the camera of the top electronic device.

2. The method of claim 1, wherein identifying the position of the top electronic device relative to the bottom electronic device comprises:
    identifying a portion of the display of the bottom electronic device that is represented by the camera data.

3. The method of claim 1, wherein the locating pattern is displayed to be invisible to a human eye.

4. The method of claim 1, wherein displaying a further locating pattern on a portion of the display of the bottom electronic device that is obscured by the top electronic device comprises: displaying the further locating pattern on a portion of the display that is aligned, at least in part, with the camera associated with the top electronic device.

5. The method of claim 1, wherein displaying a further locating pattern on a portion of the display of the bottom electronic device that is obscured by the top electronic device comprises: displaying the further locating pattern on a portion of the display that is aligned with the camera associated with the top electronic device and that is aligned with a portion of the top electronic device surrounding the camera.

6. The method of claim 1, wherein receiving camera data associated with a camera of the top electronic device comprises: receiving the camera data from the top electronic device via a communication subsystem associated with the bottom electronic device.

7. The method of claim 1, wherein obtaining display data identifying a pixel arrangement on at least a portion of the display of the bottom electronic device comprises: receiving the display data from the bottom electronic device via a communication subsystem associated with the top electronic device.

8. The method of claim 1, wherein identifying the position of the top electronic device relative to the bottom electronic device comprises determining the relative orientation of the top electronic device and the bottom electronic device, the method further comprising:
    determining whether the relative orientation satisfies first predetermined criteria and, if so, performing a first function on one or both of the top electronic device and the bottom electronic device.

9. The method of claim 8, further comprising:
    determining whether the relative orientation satisfies second predetermined criteria and, if so, performing a second function on one or both of the top electronic device and the bottom electronic device.

10. The method of claim 8, wherein performing a first function comprises implementing a preference profile.

11. The method of claim 8 wherein performing the first function comprises setting an alarm to a quiet mode and wherein performing the second function comprises setting an alarm to an audible mode.

12. The method of claim 1, further comprising:
based on the identified position, providing a complementary user interface mode in which a display screen is displayed on the top electronic device that is related to a display screen displayed on the bottom electronic device.

13. The method of claim 12, wherein providing a complementary user interface mode comprises:
displaying, on a display on a top surface of the top electronic device, a display screen having one or more features aligned with features on a display screen displayed on the display of the bottom electronic device.

14. The method of claim 12, wherein identifying the position of the top electronic device relative to the bottom electronic device comprises identifying a portion of the display of the bottom electronic device that is aligned with a display of the top electronic device and wherein providing a complementary user interface mode comprises displaying, on the display of the top electronic device, content extracted from a display screen intended for display on the identified portion of the display of the bottom electronic device.

15. A top electronic device comprising:
a camera mounted on a bottom of the top electronic device;
a communication subsystem for communicating with a bottom electronic device; and
a processor configured to:
receive camera data associated with the camera of the top electronic device, the camera facing a display on a top surface of the bottom electronic device when the top electronic device is stacked on top of the bottom electronic device;
obtain display data identifying a pixel arrangement on at least a portion of the display of the bottom electronic device, the display data comprising information about a locating pattern which occupies the entirety of the display of the bottom electronic device;
identify the position of the top electronic device relative to the bottom electronic device based on the camera data and the display data, wherein identifying the position of the top electronic device relative to the bottom electronic device based on the camera data and the display data comprises identifying the portion of the locating pattern corresponding to the camera data;
after the position of the top electronic device has been identified relative to the bottom electronic device, displaying a further locating pattern on a portion of the display of the bottom electronic device that is obscured by the top electronic device, and wherein the further locating pattern does not occupy the entirety of the display of the bottom electronic device and wherein the further locating pattern is only displayed at a portion of the display of the bottom electronic device that is obscured by the top electronic device,
wherein, in response to a movement of the top electronic device with respect to the bottom electronic device, the further locating pattern moves along the display of the bottom electronic device to remain aligned with the camera of the top electronic device.

* * * * *